US005800577A

United States Patent [19]
Kido

[11] Patent Number: 5,800,577
[45] Date of Patent: Sep. 1, 1998

[54] POLISHING COMPOSITION FOR CHEMICAL MECHANICAL POLISHING

[75] Inventor: Takanori Kido, Shiojiri, Japan

[73] Assignee: Showa Denko K.K., Tokyo, Japan

[21] Appl. No.: 895,954

[22] Filed: Jul. 17, 1997

[30] Foreign Application Priority Data

Aug. 6, 1996 [JP] Japan .................................. 8-223072

[51] Int. Cl.$^6$ .................................................. C09G 1/02
[52] U.S. Cl. .................... 51/307; 51/308; 51/309; 106/3; 252/79.2; 252/79.4
[58] Field of Search .............................. 106/3; 252/79.2, 252/79.4; 51/307–309

[56] References Cited

U.S. PATENT DOCUMENTS

| | | | |
|---|---|---|---|
| 4,992,135 | 2/1991 | Doan | 156/636 |
| 5,112,513 | 5/1992 | Bressel et al. | 252/79.1 |
| 5,472,630 | 12/1995 | Ouyang et al. | 252/156 |

*Primary Examiner*—Deborah Jones
*Attorney, Agent, or Firm*—Frishauf, Holtz, Goodman, Langer & Chick, P.C.

[57] ABSTRACT

A polishing composition for chemical mechanical polishing which comprises a carboxylic acid, an oxidizing agent, and water and has pH adjusted to 5 to 9 with an alkali. In chemical mechanical polishing for obtaining a high precision surface, particularly in chemical mechanical polishing for forming a circuit layer in production of semiconductor devices, the polishing composition shows a high polishing rate, has a high selectivity for circuit materials from insulation films, forms few corrosion marks or dishing, has neutral pH, does not contain any metal components which adversely affect properties of semiconductor devices, does not require any special expensive chemical agents, and does not comprise any substances harmful for human health as the main component.

7 Claims, No Drawings

POLISHING COMPOSITION FOR CHEMICAL MECHANICAL POLISHING

FIELD OF THE INVENTION

The present invention relates to a polishing composition for chemical mechanical polishing. More particularly, the present invention relates to a polishing composition which shows a high polishing rate to enable efficient polishing, forms few corrosion marks or dishing to produce a high precision finished surface, and is advantageously applied to production of semiconductor devices.

PRIOR ART OF THE INVENTION

Chemical mechanical polishing has generally been used as an effective method for obtaining a high precision finished surface. In the production of semiconductor devices, requirements caused by the depth of a focus in the photolithography process and other requirements are raised as the degree of integration is increased and multi-layer structures are used in semiconductor devices, and introduction of the chemical mechanical polishing has been proposed and actively examined to satisfy these requirements. For example, Japanese Patent Publication Heisei 6(1994)-103681, Japanese Patent Application Laid-Open No. Heisei 6(1994)-132287, and Japanese Patent Application Laid-Open No. Heisei 7(1995)-233485 disclose processes in which a material for circuits, such as copper, is buried in holes and grooves formed in an insulation film on a process wafer, and circuits are formed by removing the portion of the material for circuits which is present above the surface of the insulation film by polishing.

In the chemical mechanical polishing to achieve a high precision surface, particularly in chemical mechanical polishing in the production of semiconductor devices, it is considered to be preferable for preventing mechanical damage on products for polishing as much as possible that abrasive grains having a low ability of mechanical polishing, i.e., soft abrasive grains having small diameters, are used. In some extreme cases, conducting the polishing without using abrasive grains has been examined to eliminate the contribution of the mechanical polishing with abrasive grains. Moreover, in a process for forming a circuit layer by chemical mechanical polishing in the production of semiconductor devices, it is desired that the polishing rate of an insulation film be kept as low as possible. Decrease in the contribution of the mechanical polishing is preferable also for decreasing the polishing rate.

For a polishing composition having a small ability of mechanical polishing to exhibit a high polishing rate, it is essential that the polishing composition be provided with a large ability of chemical polishing. However, an excessively large ability of chemical polishing causes problems. This can be understood, for example, from the following description published in Denshi Zairyo, May 1996, page 82: A polishing composition generally comprises an additive to oxidize or etch a material for circuits (a metal) and abrasive grains for mechanical working, and the properties required for a polishing composition are a high selectivity for a material for circuits from an insulation film ($SiO_2$) and absence of dishing (excessive etching).

Various compositions have been proposed as the polishing composition for forming a copper circuit layer. Most of these polishing compositions contain conventional oxidizing agents, such as hydrogen peroxide and transition metal salts. A polishing composition comprising abrasive grains, a chelated salt of a transition metal, and a solvent for the salt is disclosed in Japanese Patent Publication Heisei 6(1994)-103681. A polishing composition which contains abrasive grains composed of alumina, comprises potassium hydroxide as the main component and has pH of about 3 is disclosed in Japanese Patent Application Laid-Open No. Heisei 6(1994)-132287. A polishing composition comprising abrasive grains composed of an aqueous colloidal silica sol or gel and polishing accelerator composed of a salt of persulfuric acid is disclosed in Japanese Patent Application Laid-Open No. Heisei 6(1994)-313164. A polishing composition comprising at least one organic acid selected from aminoacetic acids and amidosulfuric acids, an oxidizing agent, and water is disclosed in Japanese Patent Application Laid-Open No. Heisei 7(1995)-233485. A polishing composition comprising an etching agent containing an aminoacetic acid and/or an amidosulfuric acid, an oxidizing agent, and water and a chemical agent which contains at least benzotriazole or a derivative of benzotriazole and forms a protective layer on a material for circuits is disclosed in Japanese Patent Application Laid-Open No. Heisei 8(1996)-83780. A polishing composition which is prepared by mixing a commercially available slurry containing an aqueous solution of an organic acid and alumina suspended in the solution and a 30% aqueous solution of hydrogen peroxide immediately before use and has pH of 3.6 to 3.8 is described in Preprint of Semicon Kansai 96 ULSI Technical Seminar, pages 2-49 to 2-50.

A polishing composition comprising water, α-alumina, boehmite, and ammonium salt of an inorganic or organic acid is disclosed in Japanese Patent Application Laid-Open No. Heisei 2(1990)-158683 although this composition can hardly be included in the category of the chemical mechanical polishing composition.

As the result of an increased ability of chemical polishing, many of the above polishing compositions have a problem in that corrosion marks are formed on the polished surface and the phenomenon of forming depressions on the surface by excessive etching of a material for circuits, i.e., so-called dishing, tends to occur in the actual industrial process although a higher polishing rate is surely achieved.

The problem of the formation of corrosion marks and dishing is overcome to some extent by the polishing compositions disclosed in Japanese Patent Application Laid-Open No. Heisei 7(1995)-233485 and Japanese Patent Application Laid-Open No. Heisei 8(1996)-83780. However, the polishing rate described in the examples of these applications is 220 nm/min, at most. Moreover, pH must be adjusted to a value as high as 10.5 to obtain the largest polishing rate. The polishing rate of neutral polishing compositions described in the specifications of these applications is, for example, as small as 77 nm/min. It is described in Japanese Patent Application Laid-Open No. Heisei 7(1995)-233485 that a polishing rate as high as 950 nm/min can be achieved in a system containing an amidosulfuric acid and hydrogen peroxide. However, the problem of the formation of corrosion marks and dishing cannot be solved completely in this case because the etching rate has a considerably large value of 50 nm/min.

The polishing composition disclosed in Japanese Patent Application Laid-Open No. Heisei 2(1990)-158683 is essentially a mechanical polishing composition. This composition requires α-alumina which is baked at a temperature of 1,100° C. or higher and has a strong ability of mechanical polishing. The ammonium salt of an inorganic or organic acid comprised in the composition is added for controlling dispersion of grains in the system containing α-alumina and boehmite sol. A polishing composition having a strong ability of mechanical polishing, such as this polishing composition, exhibits the effect of the chemical polishing on a product for polishing only negligibly. Therefore, this polishing composition is insufficient for achieving a high precision surface which is the object of the present invention.

Many of conventional polishing compositions for chemical mechanical polishing are alkaline or acidic. Therefore, a neutral composition has been desired from the standpoint of the corrosion of materials of apparatuses, handling of the composition in working, and disposal of waste fluids. Many of conventional polishing compositions for chemical mechanical polishing has metal components which adversely affect properties of semiconductor devices, use specific expensive chemicals, or contain substances harmful for human health as the main component. A polishing composition which do not have such problems has been desired.

SUMMARY OF THE INVENTION

Accordingly, the present invention has an object of providing a polishing composition which shows a high polishing rate, has a high selectivity for circuit materials from insulation films, forms few corrosion marks or dishing, has neutral pH, does not contain metal components which adversely affect properties of semiconductor devices, does not require any special expensive chemical agents, and does not comprise any substances harmful for human health as the main component in chemical mechanical polishing for obtaining a high precision surface, particularly in chemical mechanical polishing for forming a circuit layer in the production of semiconductor devices.

As the result of extensive studies conducted by the present inventors to overcome the above problems, it was found that a polishing composition for chemical mechanical polishing which comprises a carboxylic acid, an oxidizing agent, and water and has pH adjusted to 5 to 9 by addition of a suitable amount of an alkali shows a high polishing rate, has a high selectivity for circuit materials from insulation films, and enables polishing with decreased formation of corrosion marks or dishing in chemical mechanical polishing for obtaining a high precision surface, particularly in chemical mechanical polishing for forming a circuit layer in the production of semiconductor devices. The present invention has been completed based on this knowledge.

Thus, the present invention provides:

(1) A polishing composition for chemical mechanical polishing which comprises a carboxylic acid, an oxidizing agent, and water and has pH adjusted to 5 to 9 with an alkali;

(2) A polishing composition described in (1), wherein the alkali is ammonia;

(3) A polishing composition described in (1), wherein the carboxylic acid is one or more compounds selected from the group consisting of malic acid, nicotinic acid, gluconic acid, citric acid, and tartaric acid;

(4) A polishing composition described in (1), wherein the oxidizing agent is hydrogen peroxide;

(5) A polishing composition described in (1), wherein the polishing composition additionally comprises phosphoric acid.;

(6) A polishing composition described in (1), wherein the polishing composition additionally comprises abrasive grains; and (7) A polishing composition described in (6), wherein the abrasive grains are grains of one or more abrasives selected from the group consisting of aluminum oxide, silicon oxide, titanium oxide, and zirconium oxide.

The preferable embodiments of the present invention include:

(8) A polishing composition described in (1), wherein pH is adjusted to 6 to 8;

(9) A polishing composition described in (1), wherein the carboxylic acid has a molecular weight of 100 to 300;

(10) A polishing composition described in (1), wherein the polishing composition contains 0.1 to 5 parts by weight of the carboxylic acid per 100 parts by weight of the polishing composition;

(11) A polishing composition described in (1), wherein the polishing composition contains 0.01 to 10 parts by weight of the oxidizing agent per 100 parts by weight of the polishing composition;

(12) A polishing composition described in (1), wherein the polishing composition contains 0.0005 to 0.1 parts by weight of phosphoric acid per 100 parts by weight of the polishing composition; and

(13) A polishing composition described in (1), wherein the polishing composition contains 1 to 20 parts by weight of the abrasive grains per 100 parts by weight of the polishing composition.

DETAILED DESCRIPTION OF THE INVENTION

The polishing composition for chemical mechanical polishing of the present invention comprises a carboxylic acid, an oxidizing agent, and water and has pH adjusted to 5 to 9 with an alkali.

In the polishing composition of the present invention, the molecular weight of the carboxylic acid is preferably 100 to 300. When the molecular weight of the carboxylic acid is smaller than 100, the polishing rate is small, and there is the possibility that corrosion marks are formed. When the molecular weight of the carboxylic acid is larger than 300, dissolution of the carboxylic acid in water becomes difficult, and there is the possibility that the advantageous effects, i.e., the increase in the polishing rate and the decrease in the formation of corrosion marks, cannot be obtained. Moreover, when abrasive grains are used, there is the possibility that dispersion of the grains is adversely affected. Among the carboxylic acids having a molecular weight of 100 to 300, malic acid, nicotinic acid, gluconic acid, citric acid, and tartaric acid are preferable for increasing the polishing rate and preventing the formation of corrosion marks. These carboxylic acids have additional advantageous properties that these acids do not contain any metal components which are harmful for semiconductor devices, are inexpensive and easily available, and do not show harmful effects on human health because these acids are used as additives for foods.

In the polishing composition of the present invention, the carboxylic acid is contained preferably in an amount of 0.1 to 5 parts by weight, more preferably in an amount of 0.4 to 3 parts by weight, per 100 parts by weight of the polishing composition. When the amount of the carboxylic acid is less than 0.1 part by weight per 100 parts by weight of the polishing composition, there is the possibility that the polishing rate is not sufficiently increased. When the amount of the carboxylic acid is more than 5 parts by weight per 100 parts by weight of the polishing composition, there is the possibility that the tendency of the formation of corrosion marks on the polished surface is enhanced. A single type or a combination of two or more types of the carboxylic acid can be used in the polishing composition of the present invention.

The polishing composition of the present invention comprises an oxidizing agent. The oxidizing agent has the function of accelerating oxidation reaction of metals to increase the polishing rate in the chemical mechanical polishing. The oxidizing agent is not particularly limited as long as the oxidizing agent is soluble in water. Examples of the oxidizing agent include hydrogen peroxide; derivatives of permanganic acid, such as potassium permanganate; derivatives chromic acid, such as sodium chromate; nitric acid and derivatives of nitric acid; derivatives of peroxoacids, such as peroxodisulfuric acid; derivatives of oxoacids, such as perchloric acid; salts of transition metals, such as potassium ferricyanide; and organic oxidizing agents, such as peracetic acid and nitrobenzene. Among these oxidizing agents, hydrogen peroxide is preferable because hydrogen peroxide contains no metal components, forms harmless byproducts and decomposition products in the reaction, and has actually been used as a cleaning chemical fluid in the semiconductor industry.

In the polishing composition of the present invention, the oxidizing agent is contained preferably in an amount of 0.01 to 10 parts by weight per 100 parts by weight of the polishing composition. When the amount of the oxidizing agent is less than 0.01 part by weight per 100 parts by weight of the polishing composition, the function of increasing the polishing ability is not effectively exhibited, and there is the possibility that the polishing rate is not increased. When the amount of the oxidizing agent is more than 10 parts by weight per 100 parts by weight of the polishing composition, the polishing rate is not increased to the degree expected from the increased amount of the oxidizing agent, and the amount is economically disadvantageous.

When hydrogen peroxide is used as the oxidizing agent in the polishing composition of the present invention, it is preferable for preventing change in the composition caused by decomposition of hydrogen peroxide during storage that an aqueous solution of hydrogen peroxide of a prescribed concentration and a composition which provides the desired polishing composition by being mixed with the aqueous solution of hydrogen peroxide are separately prepared in advance, and these two components are mixed together immediately before use for the chemical mechanical polishing.

In the polishing composition of the present invention, pH is adjusted to 5 to 9, preferably to 6 to 8, with an alkali. By adjusting pH of the polishing composition to 5 to 9, activated dissolution of materials for circuits can be suppressed to prevent the formation of corrosion marks, and a high polishing rate can also be obtained. By adjusting pH of the polishing composition to 6 to 8, the formation of corrosion marks can be still more decreased, the possibility of corrosion of materials of apparatuses can be eliminated, and handling of the composition in working and disposal of waste fluids can be facilitated. The method of adjusting pH is not particularly limited. For example, an alkali may be added directly to the polishing composition, or a portion or the entire amount of the alkali to be used may be added in the form of an alkali salt of a carboxylic acid or phosphoric acid. The alkali which is used for the adjustment of pH is not particularly limited. Examples of the alkali include hydroxides of alkali metals, such as sodium hydroxide and potassium hydroxide; carbonates of alkali metals, such as sodium carbonate and potassium carbonate; hydroxides of alkaline earth metals, such as calcium hydroxide; ammonia; and amines. Among these alkalis, ammonia is preferable because ammonia does not contain any alkali metals which cause deterioration of properties of semiconductor devices and also because ammonia has actually been used as a chemical agent for cleaning in the semiconductor industry. Ammonia has drawbacks in that the concentration of a solution tends to change because ammonia has a large volatility in an alkaline region and that ammonia has an irritating smell. However, the polishing composition of the present invention has pH in a neutral region, and ammonia stays stable in water as the ammonium ion. Therefore, the above problems do not arise.

In the polishing composition of the present invention, phosphoric acid may be comprised additionally. When a very small amount of phosphoric acid is comprised, the formation of corrosion marks is prevented, and the polishing rate is increased, providing the composition with the advantageous polishing property. It is considered that phosphoric acid exhibits a catalytic function on the chemical reaction while the chemical mechanical polishing proceeds. In the polishing composition of the present invention, the amount of phosphoric acid is preferably 0.0005 to 0.1 parts by weight, more preferably 0.001 to 0.01 part by weight, per 100 parts by weight of the polishing composition. When the amount of phosphoric acid is less than 0.0005 parts by weight per 100 parts by weight of the polishing composition, the effect of increasing the polishing rate is not remarkably exhibited. When the amount of phosphoric acid is more than 0.1 part by weight per 100 parts by weight of the polishing composition, the activated dissolution becomes dominant in the chemical mechanical polishing, and there is the possibility that the tendency of forming corrosion marks on the polished surface is enhanced.

In the polishing composition of the present invention, it is possible that the necessary polishing rate in the chemical mechanical polishing of materials for circuits is achieved by grinding with a polishing pad alone without using abrasive grains in the polishing composition when the working pressure and rotation speed of a platen are suitably increased. However, it is preferable for obtaining a still higher polishing rate that the polishing composition additionally comprises abrasive grains. The amount of the abrasive grains is preferably 1 to 20 parts by weight per 100 parts by weight of the polishing composition. When the amount of the abrasive grains is less than 1 parts by weight per 100 parts by weight of the polishing composition, the contribution of the abrasive grains to the ability of mechanical polishing is small, and there is the possibility that the effect of the abrasive grains is not remarkably exhibited. When the amount of the abrasive grains is more than 20 parts by weight per 100 part by weight of the polishing composition, the ability of mechanical polishing is not increased to the degree expected from the used amount of the abrasive grains. This means that the amount of the abrasive grains for the chemical mechanical polishing which are generally expensive is more than necessary and economically disadvantageous.

In the polishing composition of the present invention, abrasive grains having a small ability of mechanical polishing, i.e., soft abrasive grains having small grain diameters, which are generally used in the chemical mechanical polishing are preferably used as the abrasive grains. A high purity abrasive grains containing little impurities which cause deterioration in properties of semiconductor devices is preferable. Examples of such abrasive grains include abrasive grains of aluminum oxide, silicon oxide, titanium oxide, and zirconium oxide. In the polishing composition of the present invention, a single type or a combination of two or more types of the abrasive grains can be used.

In the polishing composition of the present invention, various types of conventional additives which are widely used in polishing compositions, such as dispersants, buffer agents, and viscosity modifiers, can be comprised within the range in which the advantageous properties of the polishing composition of the present invention are not adversely affected.

In the chemical mechanical polishing for obtaining a high precision surface, particularly in chemical mechanical polishing for forming a circuit layer in the production of semiconductor devices, it is generally necessary for decreasing the contribution of the mechanical polishing that the polishing composition be provided with a large ability of chemical polishing. When the material for polishing is a metal, such as a material for circuits, it is effective that an oxidizing agent which forces the corrosion reaction to take place on the surface of the metal is added. Corrosion of a metal is considered to take place always through a reaction of forming a film on the surface. When the formed film has a large solubility and a large rate of dissolution, the activated dissolution takes place.

When the activated dissolution is dominant and the dissolution rate is large, corrosion marks are formed on the surface of a metal because the local dissolution rate depends on the microstructure of the metal. The dishing phenomenon takes places in addition to the formation of corrosion marks in the chemical mechanical polishing of materials for circuits in an industrial process. This arises because an insulation film is not corroded while dissolution of a material for circuits continues to proceed when the polishing reaches to the stage in which the surface of the insulation film is exposed. In other words, corrosion marks and dishing are formed by the same cause, and the degree of formation of dishing in an industrial process can be estimated by evaluating the degree of formation of corrosion marks.

The polishing composition for the chemical mechanical polishing of the present invention comprises a carboxylic acid, an oxidizing agent, and water and has pH adjusted in a neutral region with an alkali. Therefore, the polishing composition shows a high polishing rate, has a high selectivity for circuit materials from insulation films, and forms few corrosion marks or dishing in the chemical mechanical polishing for obtaining a high precision surface, particularly in the chemical mechanical polishing for forming a circuit layer in the production of semiconductor devices. Because the polishing composition of the present invention does not contain any metal components which adversely affect properties of semiconductor devices and is neutral, handling of the polishing composition in working and disposal of waste fluids are facilitated. The advantageous polishing properties of the polishing composition of the present invention can be still more enhanced when the polishing composition additionally comprises phosphoric acid or abrasive grains in accordance with necessary.

To summarize the advantages of the present invention, the polishing composition of the present invention can advantageously be used in chemical mechanical polishing for obtaining a high precision surface, particularly in chemical mechanical polishing for forming a circuit layer in the production of semiconductor devices, because the polishing composition shows a high polishing rate, has a high selectivity for circuit materials from insulation films, forms few corrosion marks or dishing, has neutral pH, does not contain any metal components which adversely affect properties of semiconductor devices, does not require any expensive chemical agents, and does not comprise any substances harmful for human health as the main component.

EXAMPLES

The present invention is described in more detail with reference to examples in the following. However, the present invention is not limited by the examples.

Example 1

Prescribed amounts of ultra-pure water, malic acid (special reagent grade; molecular weight, 134), phosphoric acid for electronic industry, an aqueous solution of hydrogen peroxide for electronic industry, and an aluminum oxide abrasive prepared from high purity aluminum oxide (a product of SHOWA DENKO K. K.) were mixed together, and pH of the resultant mixture was adjusted to neutral by adding a suitable amount of an aqueous solution of ammonia for electronic industry. After diluting the obtained mixture with ultra-pure water, a polishing composition which contained 5.3 parts by weight of the aluminum oxide abrasive, 1 part by weight of malic acid, 2 parts by weight of hydrogen peroxide, and 0.01 part by weight of phosphoric acid per 105.3 parts by weight of the polishing composition and had pH of 7.5 was obtained.

The ability of this polishing composition to polish copper was evaluated in accordance with the following method:

[Conditions of polishing]

work: a pellet of 20 mm$\phi$ and 5 mmt made of copper (nominal purity: 3N5)×5 (prepared by attaching to a glass substrate of 110 mm$\phi$)

pad: a two-layered pad for chemical mechanical polishing polishing machine: a single face polishing machine; diameter of a platen, 320 mm speed of rotation of a platen: 60 rpm pressure of working: 220 gf/cm$^2$ speed of supply of a polishing composition: 30 ml/min polishing time: 30 minutes

[Items for evaluation]

polishing rate: obtained by measuring thickness of a work before and after polishing by a micrometer corrosion marks: evaluated by visual observation and observation using an optical microscope The polishing rate was found to be as high as 310 nm/min. No corrosion mark was found at all on the polished surface.

Then, for evaluation of the selectivity for the material for circuits from the insulation film, the ability to polish a thermally oxidized film formed on a silicon substrate was evaluated by using the same polishing composition in accordance with the following method:

[Conditions of polishing]

work: a thermally oxidized film formed on a 5"$\phi$ silicon wafer (thickness of film, about 1.5 μm)

pad: a two-layered pad for chemical mechanical polishing polishing machine: a single face polishing machine; diameter of a platen, 720 mm speed of rotation of a platen: 30 rpm pressure of working: 220 gf/cm$^2$ speed of supply of a polishing composition: 100 ml/min polishing time: 5 minutes

[Item for evaluation]

polishing rate: obtained by measuring thickness of a work before and after polishing with an ellipsometer The polishing rate was found to be as low as 5 nm/min. Therefore, the selectivity for the material for circuits from the insulation film is a very large value exceeding 60.

Then, a polishing composition having the ability of mechanical polishing alone was prepared by mixing 100 parts by weight of ultra-pure water and 5.3 parts by weight of an aluminum oxide abrasive prepared from high purity aluminum oxide (a product of SHOWA DENKO K. K.), and the ability to polish a thermally oxidized film was evaluated in accordance with the same method as the above. The polishing rate was found to be 5 nm/min. It is concluded from the above results that the ability of mechanical polishing alone contributes to the polishing rate of the polishing composition of the present invention when the insulation film is polished.

Example 2

A polishing composition which contained 5.3 parts by weight of the aluminum oxide abrasive, 5 part by weight of malic acid, 2 parts by weight of hydrogen peroxide, and 0.01 part by weight of phosphoric acid per 105.3 parts by weight of the polishing composition and had pH of 7.5 was obtained in accordance with the same procedures as those conducted in Example 1.

The ability to polish copper was evaluated in accordance with the same method as that conducted in Example 1. The polishing rate was 730 nm/min, and very few corrosion marks were found on the polished surface.

Example 3

A polishing composition which contained 5.3 parts by weight of the aluminum oxide abrasive, 0.5 parts by weight of malic acid, 2 parts by weight of hydrogen peroxide, and 0.01 part by weight of phosphoric acid per 105.3 parts by weight of the polishing composition and had pH of 7.5 was obtained in accordance with the same procedures as those conducted in Example 1.

The ability to polish copper was evaluated in accordance with the same method as that conducted in Example 1. The polishing rate was 150 nm/min, and no corrosion mark was found at all on the polished surface.

Example 4

A polishing composition which contained 5.3 parts by weight of the aluminum oxide abrasive, 1 part by weight of malic acid, and 2 parts by weight of hydrogen peroxide per 105.3 parts by weight of the polishing composition and had pH of 7.5 was obtained in accordance with the same procedures as those conducted in Example 1.

The ability to polish copper was evaluated in accordance with the same method as that conducted in Example 1. The polishing rate was 210 nm/min, and no corrosion mark was found at all on the polished surface.

The results of Examples 1 to 4 are shown in Table 1.

TABLE 1

| | malic acid (part by wt.) | phosphoric acid (part by wt.) | hydrogen peroxide (part by wt.) | polishing rate (nm/min) | corrosion mark |
|---|---|---|---|---|---|
| Example 1 | 1 | 0.01 | 2 | 310 | none |
| Example 2 | 5 | 0.01 | 2 | 730 | very few |
| Example 3 | 0.5 | 0.01 | 2 | 150 | none |
| Example 4 | 1 | 0 | 2 | 210 | none |

In the polishing compositions of the present invention obtained in Examples 1 to 4, the higher the amount of malic acid, the larger the polishing rate. When the amount of malic acid was kept the same, the composition containing phosphoric acid showed a larger polishing rate than that of the composition which did not contain phosphoric acid. Therefore, a polishing composition having a desired polishing rate can be prepared by suitably selecting the amounts of malic acid and phosphoric acid. No corrosion mark was found at all except that very few corrosion marks were found in Example 2 in which the polishing rate was the largest. Thus, the polishing composition for chemical mechanical polishing of the present invention could achieve a high precision surface even though the polishing rate was large.

Example 5

A polishing composition which contained 5.3 parts by weight of the aluminum oxide abrasive, 1 part by weight of nicotinic acid, 0.2 parts by weight of hydrogen peroxide, and 0.001 part by weight of phosphoric acid per 105.3 parts by weight of the polishing composition and had pH of 7.5 was obtained in accordance with the same procedures as those conducted in Example 1.

The ability to polish copper was evaluated in accordance with the same method as that conducted in Example 1. The polishing rate was 500 nm/min, and no corrosion mark was found at all on the polished surface.

Example 6

A polishing composition which contained 5.3 parts by weight of the aluminum oxide abrasive, 2 part by weight of gluconic acid, 0.2 parts by weight of hydrogen peroxide, and 0.001 part by weight of phosphoric acid per 105.3 parts by weight of the polishing composition and had pH of 7.5 was obtained in accordance with the same procedures as those conducted in Example 1.

The ability to polish copper was evaluated in accordance with the same method as that conducted in Example 1. The polishing rate was 310 nm/min, and no corrosion mark was found at all on the polished surface.

Example 7

A polishing composition which contained 5.3 parts by weight of the aluminum oxide abrasive, 2 part by weight of citric acid, 0.2 parts by weight of hydrogen peroxide, and 0.01 part by weight of phosphoric acid per 105.3 parts by weight of the polishing composition and had pH of 7.5 was obtained in accordance with the same procedures as those conducted in Example 1.

The ability to polish copper was evaluated in accordance with the same method as that conducted in Example 1. The polishing rate was 450 nm/min, and very few corrosion marks were found on the polished surface.

Example 8

A polishing composition which contained 5.3 parts by weight of the aluminum oxide abrasive, 1 part by weight of tartaric acid, 0.2 parts by weight of hydrogen peroxide, and 0.001 part by weight of phosphoric acid per 105.3 parts by weight of the polishing composition and had pH of 7.5 was obtained in accordance with the same procedures as those conducted in Example 1.

The ability to polish copper was evaluated in accordance with the same method as that conducted in Example 1. The polishing rate was 450 nm/min, and very few corrosion marks were found on the polished surface.

Example 9

A polishing composition which contained 5.3 parts by weight of the aluminum oxide abrasive, 1 part by lactic acid, 0.2 parts by weight of hydrogen peroxide, and 0.01 part by weight of phosphoric acid per 105.3 parts by weight of the polishing composition and had pH of 7.5 was obtained in accordance with the same procedures as those conducted in Example 1.

The ability to polish copper was evaluated in accordance with the same method as that conducted in Example 1. The polishing rate was 500 nm/min, and few corrosion marks were found on the polished surface.

Example 10

A polishing composition which contained 5.3 parts by weight of the aluminum oxide abrasive, 1 part by weight of acetic acid, 0.2 parts by weight of hydrogen peroxide, and 0.001 part by weight of phosphoric acid per 105.3 parts by weight of the polishing composition and had pH of 7.5 was obtained in accordance with the same procedures as those conducted in Example 1.

The ability to polish copper was evaluated in accordance with the same method as that conducted in Example 1. The polishing rate was 110 nm/min, and few corrosion marks were found on the polished surface.

Example 11

A polishing composition which contained 5.3 parts by weight of the aluminum oxide abrasive, 1 part by weight of oxalic acid, 0.2 parts by weight of hydrogen peroxide, and 0.001 part by weight of phosphoric acid per 105.3 parts by weight of the polishing composition and had pH of 7.5 was obtained in accordance with the same procedures as those conducted in Example 1.

The ability to polish copper was evaluated in accordance with the same method as that conducted in Example 1. The polishing rate was 130 nm/min, and few corrosion marks were found on the polished surface.

The results of Examples 5 to 11 are shown in Table 2.

TABLE 2

| | carboxylic acid | | | phosphoric acid (part by wt.) | polishing rate (nm/min) | corrosion mark |
|---|---|---|---|---|---|---|
| | type | molecular weight | amount (part by wt.) | | | |
| Example 5 | nicotinic acid | 123 | 1 | 0.001 | 500 | none |
| Example 6 | gluconic acid | 196 | 2 | 0.001 | 310 | none |
| Example 7 | citric acid | 192 | 2 | 0.01 | 450 | very few |
| Example 8 | tartaric acid | 150 | 1 | 0.001 | 450 | very few |
| Example 9 | lactic acid | 90 | 1 | 0.01 | 500 | few |
| Example 10 | acetic acid | 60 | 1 | 0.001 | 110 | few |
| Example 11 | oxalic acid | 90 | 1 | 0.001 | 130 | few |

It is understood from the above results that, as the contents of the carboxylic acid and phosphoric acid in the polishing composition of the present invention were kept the same in Examples 5 to 11, the polishing compositions containing a carboxylic acid having a molecular weight of 100 or more showed a higher polishing rate and a better result on the corrosion mark than those of the polishing compositions containing a carboxylic acid having a molecular weight less than 100.

Example 12

A polishing composition which contained 5.3 parts by weight of a silicon oxide abrasive, 1 part by weight of malic acid, 2 parts by weight of hydrogen peroxide, and 0.01 part by weight of phosphoric acid per 105.3 parts by weight of the polishing composition and had pH of 7.5 was obtained in accordance with the same procedures as those conducted in Example 1.

The ability to polish copper was evaluated in accordance with the same method as that conducted in Example 1. The polishing rate was 290 nm/min, and no corrosion mark was found at all on the polished surface.

Example 13

A polishing composition which contained 5.3 parts by weight of a titanium oxide abrasive, 1 part by weight of malic acid, 2 parts by weight of hydrogen peroxide, and 0.01 part by weight of phosphoric acid per 105.3 parts by weight of the polishing composition and had pH of 7.5 was obtained in accordance with the same procedures as those conducted in Example 1.

The ability to polish copper was evaluated in accordance with the same method as that conducted in Example 1. The polishing rate was 510 nm/min, and no corrosion mark was found at all on the polished surface.

Example 14

A polishing composition which contained 5.3 parts by weight of a zirconium oxide abrasive, 1 part by weight of malic acid, 2 parts by weight of hydrogen peroxide, and 0.01 part by weight of phosphoric acid per 105.3 parts by weight of the polishing composition and had pH of 7.5 was obtained in accordance with the same procedures as those conducted in Example 1.

The ability to polish copper was evaluated in accordance with the same method as that conducted in Example 1. The polishing rate was 470 nm/min, and no corrosion mark was found at all on the polished surface.

The results of Examples 12 to 14 are shown in Table 3.

TABLE 3

| | abrasive | polishing rate (nm/min) | corrosion mark |
|---|---|---|---|
| Example 12 | silicon oxide | 290 | none |
| Example 13 | titanium oxide | 510 | none |
| Example 14 | zirconium oxide | 470 | none |

It is understood from the results of Examples 12 to 14 that the polishing compositions of the present invention in which silicon oxide, titanium oxide, or zirconium oxide was used as the abrasive in place of aluminum oxide could achieve a high precision surface even though the polishing rate was large.

Example 15

The same polishing composition as that prepared in Example 1 was prepared. A work having five pellets of 20 mmø and 5 mmt made of aluminum (prepared by attaching to a glass substrate of 110 mmø) was used in place of the work made of copper used in Example 1, and the ability to polish aluminum was evaluated in accordance with the same procedures as those conducted in Example 1.

The polishing rate was as high as 250 nm/min, and very few corrosion marks were found on the polished surface.

Comparative Example 1

A polishing composition which contained 5.3 parts by weight of the aluminum oxide abrasive and 0.2 parts by weight of hydrogen peroxide per 105.3 parts by weight of the polishing composition and had pH of 3.2 adjusted with nitric acid was prepared.

The ability to polish copper was evaluated by using the prepared polishing composition in accordance with the same method as that conducted in Example 1. The polishing rate was 160 nm/min, and corrosion marks were found on the polished surface.

Comparative Example 2

A polishing composition which contained 5.3 parts by weight of the aluminum oxide abrasive and 1 part by weight of ammonium nitrate per 105.3 parts by weight of the polishing composition and had pH of 7.0 adjusted with ammonia was prepared.

The ability to polish copper was evaluated by using the prepared polishing composition in accordance with the same method as that conducted in Example 1. The polishing rate was 60 nm/min, and corrosion marks were found on the polished surface.

Comparative Example 3

A polishing composition which contained 5.3 parts by weight of the aluminum oxide abrasive, 1 part by weight of ammonium nitrate, and 0.2 parts by weight of hydrogen peroxide per 105.3 parts by weight of the polishing composition and had pH of 7.0 adjusted with ammonia was prepared.

The ability to polish copper was evaluated by using the prepared polishing composition in accordance with the same method as that conducted in Example 1. The polishing rate was 90 nm/min, and corrosion marks were found on the polished surface.

Comparative Example 4

A polishing composition which contained 5.3 parts by weight of the aluminum oxide abrasive and 1 part by weight of ammonium persulfate per 105.3 parts by weight of the polishing composition and had pH of 7.8 was prepared.

The ability to polish copper was evaluated by using the prepared polishing composition in accordance with the same method as that conducted in Example 1. The polishing rate was 290 nm/min, and numerous corrosion marks were found on the polished surface.

Comparative Example 5

A polishing composition which contained 5.3 parts by weight of the aluminum oxide abrasive, 0.1 part by weight of aminoacetic acid, and 5 parts by weight of hydrogen peroxide per 105.3 parts by weight of the polishing composition and had pH of 5.8 was prepared.

The ability to polish copper was evaluated by using the prepared polishing composition in accordance with the same method as that conducted in Example 1. The polishing rate was 30 nm/min, and no corrosion mark was found on the polished surface.

Comparative Example 6

A polishing composition which contained 5.3 parts by weight of the aluminum oxide abrasive, 1 part by weight of aminoacetic acid, and 1 part by weight of hydrogen peroxide per 105.3 parts by weight of the polishing composition and had pH of 5.9 was prepared.

The ability to polish copper was evaluated by using the prepared polishing composition in accordance with the same method as that conducted in Example 1. The polishing rate was 380 nm/min, and corrosion marks were found on the polished surface.

Comparative Example 7

A polishing composition which contained 5.3 parts by weight of the aluminum oxide abrasive and 1 part by weight of acetic acid per 105.3 parts by weight of the polishing composition and had pH of 7.0 adjusted with ammonia was prepared.

The ability to polish copper was evaluated by using the prepared polishing composition in accordance with the same method as that conducted in Example 1. The polishing rate was 30 nm/min, and no corrosion mark was found on the polished surface.

Comparative Example 8

A polishing composition was prepared which was the same as that prepared in Example 1 except that the adjustment of pH by using an aqueous solution of ammonia was not conducted. The prepared polishing composition had pH of 2.5.

The ability to polish copper was evaluated by using the prepared polishing composition in accordance with the same method as that conducted in Example 1. The polishing rate was 640 nm/min, and corrosion marks were found on the polished surface.

The results of Comparative Examples 1 to 8 are shown in Table 4.

TABLE 4

| | hydrogen peroxide (part by wt.) | other component (part by wt.) | pH modifier | pH | polishing rate (nm/min) | corrosion mark |
|---|---|---|---|---|---|---|
| Comparative Example 1 | 0.2 | — | nitric acid | 3.2 | 160 | found |
| Comparative Example 2 | — | ammonium nitrate, 1 | ammonia | 7.0 | 60 | found |
| Comparative Example 3 | 0.2 | ammonium nitrate, 1 | ammonia | 7.0 | 60 | found |
| Comparative Example 4 | — | ammonium persulfate, 1 | — | 7.8 | 290 | numerous |
| Comparative Example 5 | 5 | aminoacetic acid, 0.1 | — | 5.8 | 30 | none |

TABLE 4-continued

|  | hydrogen peroxide (part by wt.) | other component (part by wt.) | pH modifier | pH | polishing rate (nm/min) | corrosion mark |
| --- | --- | --- | --- | --- | --- | --- |
| Comparative Example 6 | 1 | aminoacetic acid, 1 | — | 5.9 | 380 | found |
| Comparative Example 7 | — | acetic acid, 1 | ammonia | 7.0 | 30 | none |
| Comparative Example 8 | 2 | malic acid, 1 phosphoric acid, 0.01 | — | 2.5 | 640 | found |

Among the conventional polishing compositions for chemical mechanical polishing used in Comparative Examples 1 to 7 and the polishing composition used in Comparative Example 8 which was prepared without the adjustment of pH with an alkali, the polishing compositions used in Comparative Examples 5 and 7 had very small polishing rates although no corrosion mark was found on the polished surfaces. The polishing compositions used in Comparative Examples 1, 5, 6, and 8 had relatively large polishing rates, but corrosion marks were found on the polished surfaces. The polishing compositions used in Comparative Examples 2 and 3 had small polishing rates, and corrosion marks were found on the polished surfaces.

What is claimed is:

1. A polishing composition for chemical mechanical polishing which comprises a carboxylic acid, an oxidizing agent, and water and has pH adjusted to 5 to 9 with an alkali.

2. A polishing composition according to claim 1, wherein the alkali is ammonia.

3. A polishing composition according to claim 1, wherein the carboxylic acid is one or more compounds selected from the group consisting of malic acid, nicotinic acid, gluconic acid, citric acid, and tartaric acid.

4. A polishing composition according to claim 1, wherein the oxidizing agent is hydrogen peroxide.

5. A polishing composition according to claim 1, wherein the polishing composition additionally comprises phosphoric acid.

6. A polishing composition according to claim 1, wherein the polishing composition additionally comprises abrasive grains.

7. A polishing composition according to claim 6, wherein the abrasive grains are grains of one or more abrasives selected from the group consisting of aluminum oxide, silicon oxide, titanium oxide, and zirconium oxide.

* * * * *